United States Patent
Thomas

(10) Patent No.: US 9,432,089 B2
(45) Date of Patent: *Aug. 30, 2016

(54) CONFIGURATION METHOD OF A MULTIMEDIA SYSTEM

(71) Applicant: NAGRAVISION S.A., Cheseaux-sur-Lausanne (CH)

(72) Inventor: Frederic Thomas, Onex (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/959,792

(22) Filed: Dec. 4, 2015

(65) Prior Publication Data

US 2016/0087684 A1 Mar. 24, 2016

Related U.S. Application Data

(63) Continuation of application No. 14/204,362, filed on Mar. 11, 2014, now Pat. No. 9,236,932.

(60) Provisional application No. 61/775,737, filed on Mar. 11, 2013.

(51) Int. Cl.
| | |
|---|---|
| *H04B 5/00* | (2006.01) |
| *G06F 9/54* | (2006.01) |
| *G06Q 20/32* | (2012.01) |
| *G06Q 20/38* | (2012.01) |
| *G06Q 20/42* | (2012.01) |

(Continued)

(52) U.S. Cl.
CPC ............. *H04B 5/0031* (2013.01); *G06F 9/54* (2013.01); *G06Q 20/3278* (2013.01); *G06Q 20/385* (2013.01); *G06Q 20/425* (2013.01); *G06Q 30/0637* (2013.01); *H04B 7/15* (2013.01); *H04L 41/50* (2013.01); *H04L 47/70* (2013.01); *H04L 67/34* (2013.01); *H04L 69/08* (2013.01); *H04N 5/4403* (2013.01); *H04N 21/2543* (2013.01); *H04N 21/4126* (2013.01); *H04N 21/4184* (2013.01); *H04N 21/41407* (2013.01); *H04N 21/4222* (2013.01); *H04N 21/42221* (2013.01); *H04N 21/43615* (2013.01); *H04N 21/43637* (2013.01); *H04N 21/47815* (2013.01); *H04N 21/485* (2013.01); *H04W 4/001* (2013.01); *H04W 4/008* (2013.01); *H04W 76/02* (2013.01)

(58) Field of Classification Search
CPC .................. H04B 5/0031; G06Q 20/3278
USPC ........... 455/11.1, 41.1, 41.2, 41.3, 3.06, 3.01
See application file for complete search history.

(56) References Cited

U.S. PATENT DOCUMENTS 5,844,052 A * 12/1998 Keller .................. C04B 35/571
522/148
8,233,937 B2 * 7/2012 Ueda ...................... G06F 3/023
455/11.1

(Continued)

OTHER PUBLICATIONS

European Search Report issued in European Application No. 14158742 dated Mar. 11, 2015.

*Primary Examiner* — John J Lee
(74) *Attorney, Agent, or Firm* — DLA Piper LLP US

(57) ABSTRACT

A configuration method of a multimedia system comprising a first device and at least one adjacent device having a mechanism to communicate with the first device. The first device comprises a mechanism to read/write data from/to an NFC data carrier. The method comprises a set-up phase and an exploitation phase.

11 Claims, 1 Drawing Sheet

(51) Int. Cl.

| | | |
|---|---|---|
| *G06Q 30/06* | (2012.01) | |
| *H04B 7/15* | (2006.01) | |
| *H04L 12/24* | (2006.01) | |
| *H04L 12/911* | (2013.01) | |
| *H04L 29/06* | (2006.01) | |
| *H04N 5/44* | (2011.01) | |
| *H04N 21/2543* | (2011.01) | |
| *H04N 21/41* | (2011.01) | |
| *H04N 21/414* | (2011.01) | |
| *H04N 21/422* | (2011.01) | |
| *H04N 21/4363* | (2011.01) | |
| *H04N 21/478* | (2011.01) | |
| *H04N 21/485* | (2011.01) | |
| *H04W 4/00* | (2009.01) | |
| *H04W 76/02* | (2009.01) | |
| *H04N 21/418* | (2011.01) | |
| *H04N 21/436* | (2011.01) | |
| *H04L 29/08* | (2006.01) | |

(56) References Cited

U.S. PATENT DOCUMENTS

| | | |
|---|---|---|
| 2005/0097618 A1* | 5/2005 | Arling ............ H04L 12/2805 725/114 |
| 2008/0201753 A1 | 8/2008 | Arling et al. |
| 2008/0201754 A1 | 8/2008 | Arling et al. |
| 2009/0160621 A1 | 6/2009 | Canu et al. |
| 2011/0157476 A1 | 6/2011 | Arling et al. |
| 2013/0198785 A1 | 8/2013 | Arling et al. |
| 2013/0219438 A1 | 8/2013 | Arling et al. |

* cited by examiner

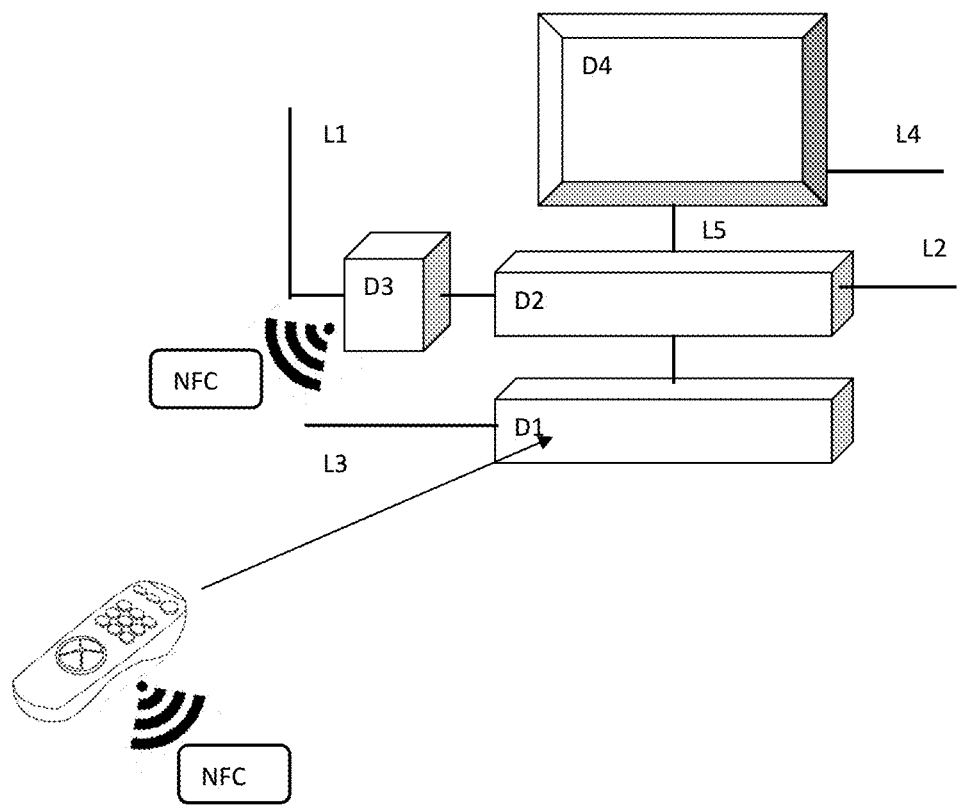

CONFIGURATION METHOD OF A MULTIMEDIA SYSTEM

CROSS-REFERENCE TO RELATED APPLICATIONS

This application is a continuation of U.S. patent application Ser. No. 14/204,362 filed Mar. 11, 2014, which claims the benefit of U.S. Provisional Application No. 61/775,737, filed Mar. 11, 2013. All of the foregoing are incorporated by reference in their entireties.

BACKGROUND

Near Field Communication Technology, known by the acronym "NFC", is a wireless, high frequency communication technology, having a range of a few centimeters, for the exchange of information between multiple devices. This technology is derived from a combination of a smart card interface and a contactless reader in a single device.

An NFC device is able to communicate with other NFC devices as well as devices operating in accordance with the ISO 14443 standard (contactless smart cards).

NFC standards cover the NFC communication protocols and data exchange formats and are based on existing standards for radio frequency identification (RFID) such as ISO/IEC 14443, FeliCa and ISO/IEC 18092. They include standards defined by the "NFC Forum", which was founded in 2004 by Nokia, Philips and Sony and includes more than 180 members.

NFC is an extension of RFID technology, allowing two-way communication between two devices, while previous systems, such as contactless smart cards, allowed only one-way communication.

NFC technology is usable only over a short distance of a few centimeters, which implies a voluntary user and prevents unintentional use.

NFC devices can be active or passive. A passive NFC device, such as a tag, a smart card or a simple chip affixed to an object contains information only readable by other NFC-enabled devices. A passive NFC device is powered by the electromagnetic field generated by a reader (active device) and therefore does not need its own power supply.

An active NFC device, however, is a device that generates an electromagnetic field. This generation can be done to communicate with a passive device (described above) or to establish a communication channel between two active devices.

The fact that a device like a smartphone has a power supply does not necessarily mean that it will work in active mode only. That is, a smartphone can handle the NFC interface in active or passive modes. In passive mode, the device emulates a chip card. In this mode, the smartphone (or any other portable device such as tablets) will store, in a secure memory, information that is normally stored in a card. Thus, when the smartphone detects an electromagnetic field, it can access the secure memory and a corresponding device having NFC capacities will be able to read information in passive mode from the secure memory.

The following are examples of known applications that use NFC technology:
  payment using a credit card or contactless (e.g., mobile phone, smartphone, laptop, tablet computer, etc.) mobile device on a contactless payment terminal;
  payment at a parking terminal accepting contactless payment using an NFC mobile terminal;
  contactless purchase of a ticket and contactless validation of a ticket displayed on a mobile phone;
  management of coupons, loyalty points, etc. in a store, at retailers, etc. (e.g., couponing);
  accessing and starting a vehicle using a mobile phone;
  reading product information (e.g., price, composition, allergy, etc.) in a store;
  controlling physical access to premises (e.g., meeting room, business, classroom, etc.);
  exchanging profiles between users of a social network or a game by bringing phones close together (e.g., user peer-to-peer communications);
  reading an electronic business card with a PDA (Personal Digital Assistant);
  synchronizing Internet bookmarks and contacts between a PDA and a mobile phone;
  recovering a key to a WiFi access point approaching an NFC device from an authorized terminal; and;
  accessing automation features of a building.

In a home environment, different devices such as e.g., a television, decoder, DVD and/or HD (hard disk) reader/writer, media player are connected to each other over a home network. As can be appreciated, it could be difficult to configure these various devices when a specific function is required. Many operations are necessary to select a specific source, switch the appropriate devices, and select the appropriate setting before finally enjoy the program desired by the consumer.

SUMMARY

Embodiments disclosed herein store configuration data on an NFC portable device. Each device comprises configuration data defining the input and output setting of the device as well as any internal settings. The configuration message comprises the configuration data and the device identifier. The collection of the configuration messages for a system is referred to herein as a set of configuration data. The set of configuration data refers to a set of connected devices, and the configuration messages can be transmitted to a first device to configure the device; the first device transferring the configuration messages to the other devices for subsequent configuration of these devices.

According to a first embodiment, the first device comprises a built-in NFC reader adapted to read the set of configuration data stored in the NFC portable device. The first device is connected with the other devices by various communication methods such as e.g., Wifi, HDMI, Ethernet, Bluetooth. The configuration data is passed to the other devices to complete the configuration of the system.

The embodiments disclosed herein includes two primary steps: set-up and the exploitation of the configuration data. The set-up phase includes the gathering of the configuration of each device and the transmission of the configuration data to the portal device, i.e., the device in connection with the NFC card. The exploitation phase occurs when a user is ready to configure the system and use one of the NFC data carriers to pass the configuration data to the system.

BRIEF DESCRIPTION OF THE FIGURE

Embodiments disclosed herein and their advantages will be better understood with reference to the enclosed drawing and to the following detailed description, in which:

FIG. 1 illustrates a system comprising a plurality of devices that are connected together and configured using an NFC data carrier.

DETAILED DESCRIPTION

FIG. 1 illustrates a multi-media system comprising different devices connected together to provide a variety of entertainment experiences. The system can provide for a plurality of particular entertainment experiences such as e.g., watching broadcast channels, watching recorded movies (on DVD or local hard disk), watching video content stored in a remote storage, playing a video game, listening to music, etc., as well as a combination of these experiences, for example when a media content should be recorded while another content is being played back.

Set-Up Phase

The first phase is the set-up phase in which the system is set to a particular function, for example, watching a broadcast channel and using the 5:1 audio system to enjoy better sound. Each device can have several inputs and several outputs. The television D4 communicates its setting (e.g., selection of input L4 or L5 or the output) as a configuration message to the set-top box D2. The set-top box device D2 is connected to an audio/video signal L2, which could be the cable network, a connection to a satellite receiver or a terrestrial antenna. The connection between devices D2 and D4 is preferably an HDMI connection. This connection allows the transfer of configuration data due to a CEC (Consumer Electronics Control) connection or an Ethernet data connection. In the illustrated example, device D2 does not contain an NFC reader and these configuration messages should be transferred to device D3, which is e.g., a network media server. Device D3 is connected with the Internet (L1) and can access on-line media content. The connection between devices D3 and D2 is preferably HDMI with the same possibility to transfer configuration data. If, for example, the version of HDMI is not compliant with the dialog necessary for transferring the configuration messages, devices D3 and D2 can communicate via a Bluetooth channel. The media content will be transferred through the HDMI while the configuration data can use a different route, for example, the Bluetooth channel.

In the example above, the state of device D1 is not important since it will not play a role in the expected function. However, in other examples, device D1 will be configured as well. Device D1 can be a DVD/HD recorder and can communicate with device D2 via HDMI or Ethernet.

Once the configuration data from each device is collected and sent to the media player D3, the set of configuration data is transferred and stored in an NFC device.

In this phase, device D3 can execute a function referred to as device discovery. Device D3 senses each of its connection to determine if another device is connected. If it is determined that another device is connected (i.e., a positive event), device D3 tries to communicate via the discovered channel(s) (e.g., HDMI, Bluetooth, Ethernet or Wifi) and collect the configuration message of each adjacent device. Device D3 asks the adjacent device to replicate the same function so that the configuration data of a device such as e.g., screen D4, not directly connected with device D3, can pass its configuration data to device D2 and then to device D3. An "adjacent device" is a device with which a direct connection can be established. It should be noted that each device has an identifier that is added as a header to the configuration data. When device D2 receives the configuration data from the screen D4, the message comprises an identifier and the configuration data of the identified device, such as:

ID_D4, CONF_D4: the identifier of D4 precedes the configuration data of D4.

This message is then transferred to device D3 and device D2 adds its header:

ID_D2; ID_D4; CONF_D4

The first header being the first device to which the message will be sent during the exploitation phase (discussed below). The second header being the next device to which the message will be sent, and so on.

Preferably, each device generates and stores a list of identifiers of adjacent devices by collecting the identifiers of the adjacent devices. This list can be used to route the messages during the exploitation phase.

According to another embodiment, the message generated by a device is not modified and is forwarded to the adjacent device without adding the identifier of said device.

These messages, comprising configuration data and identifier(s), are stored in an NFC data carrier due to the reader located in device D3. The NFC data carrier can be a smartcard, dongle or any type of passive NFC device. In addition, the NFC data carrier could be a smartphone or a tablet in which the configuration data is stored.

The configuration of the system is linked with one NFC data carrier when the NFC data carrier is a passive device. However, when the NFC data carrier is an active device such as e.g., a smartphone, it is possible to store a plurality of configuration sets, each being the specific configuration of each device in the system. Each time that a specific configuration is acquired and stored, the user initiates a command preferably with the device hosting the NFC reader and this device collects the configuration data of each device of the system and stores them in the NFC data carrier.

Exploitation Phase

The NFC data carrier is presented to one of the devices that is part of the system and comprises an NFC reader. This device could be the same device D3 that was used during the set-up phase of another device.

As illustrated in FIG. 1, a remote control comprises an NFC reader. This allows the user to simply activate the NFC function on the remote control (in order to save the battery life of the remote control) and to read in the configuration data from the NFC data carrier. Once in the remote control, the set of configuration data is sent to the device with which the remote control is normally connected to (e.g., device D1 in the illustrated example).

Device D1, when the data is received, determines if some configuration data is intended for device D1. If so, the configuration data is used to configure device D1. The other configuration data is then forwarded to other devices. In the example of the FIG. 1, the configuration data received by device D1 is then transferred to device D2. Device D2 extracts the configuration data intended for device D2 and passes the other data to the adjacent devices.

The list of adjacent devices can be used to route each message to its destination. When the identifier of a message is not present in the list, device D1 sends the message of an non-adjacent device to all devices connected to it. Upon receipt of this message, device D2 checks its identifier list and determines that it is connected to device D4. Device D2 can then forward the message to device D4.

The invention claimed is:

1. A configuration method for a multimedia system comprising a first device and a first adjacent device adapted to communicate with the first device, said first device adapted to read from and write to a near field communication (NFC) data carrier, said method comprising a set-up phase and an exploitation phase, the set-up phase comprising:

collecting by the first device configuration data pertaining to the first device;

receiving by the first device from the first adjacent device a configuration message comprising configuration data and a device identifier pertaining to the first adjacent device;

forming by the first device a set of configuration messages comprising configuration data and device identifiers for the first device and the first adjacent device; and transferring the set of configuration messages to an NFC data carrier;

the exploitation phase comprising:

reading by the first device the set of configuration messages stored in the NFC data carrier;

extracting by the first device the configuration data of the first device from the set of configuration messages;

transferring by the first device to the first adjacent device the configuration message of the adjacent device; and loading the configuration data of the first device in the first device to obtain a particular entertainment function.

2. The method of claim 1, wherein the first device receives data from a remote control, said remote control comprising an NFC reader to read the NFC data carrier and to transmit the set of configuration data to the first device.

3. The method of claim 1, wherein a first adjacent device is connected to a second adjacent device, the second adjacent device not being connected with the first device, and wherein the configuration messages received by the first adjacent device is at least partly passed to the second adjacent device.

4. The method of claim 1, wherein each device comprises a device identifier and is adapted to:

send a request to an adjacent device;

receive a response containing the device identifier of the adjacent device; and build and store a list of adjacent devices.

5. The method of claim 4, wherein the first device, based on the device identification contained in the set of configuration messages and the list of adjacent devices, routes the configuration messages to the appropriate device.

6. The method of claim 1, wherein the communication between the first device and the first adjacent device is an HDMI communication.

7. A first device comprising:

a near field communication (NFC) interface adapted to read from and write to a near field communication (NFC) data carrier;

a communications interface configured for communications with a first adjacent device; and a logic circuit connected to the NFC interface and the communications interface;

wherein the first device is adapted to:

collect configuration data pertaining to the first device;

receive from the first adjacent device a configuration message comprising configuration data and a device identifier pertaining to the first adjacent device;

form a set of configuration messages comprising configuration data and device identifiers for the first device and the first adjacent device; and transfer the set of configuration messages to an NFC data carrier;

read by the set of configuration messages stored in the NFC data carrier;

extract the configuration data of the first device from the set of configuration messages;

transfer to the first adjacent device the configuration message pertaining to the first adjacent device; and load the configuration data of the first device in the first device to obtain a particular entertainment function.

8. The first device of claim 7, wherein the first adjacent device is connected to a second adjacent device, the second adjacent device not being connected with the first device, and wherein a configuration message received by the first adjacent device is at least partly passed to the second adjacent device.

9. The first device of claim 8, wherein the communication between the first device and the first adjacent device is an HDMI communication.

10. The first device of claim 9, wherein the first device receives data from a remote control, said remote control comprising an NFC reader to read the NFC data carrier and to transmit the set of configuration data to the first device.

11. The first device of claim 7, wherein the first device, based on the device identification contained in the set of configuration messages and the list of adjacent devices, routes the configuration messages to the appropriate device.

* * * * *